US012242530B2

(12) United States Patent
He et al.

(10) Patent No.: US 12,242,530 B2
(45) Date of Patent: Mar. 4, 2025

(54) HYPER-PERSONALIZED PROMPT BASED CONTENT GENERATION

(71) Applicant: Accenture Global Solutions Limited, Dublin (IE)

(72) Inventors: Yuan He, San Jose, CA (US); Anupam Anurag Tripathi, Chicago, IL (US); Anwitha Paruchuri, San Jose, CA (US); Sukryool Kang, Dublin, CA (US); Andrew Francis Hickl, Sammamish, WA (US); Sujeong Cha, Long Island City, NY (US); Surya Raghavendra Vadlamani, Newtown, PA (US); Peter Royer Smith, Jr., Sharon, CT (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/140,812

(22) Filed: Apr. 28, 2023

(65) Prior Publication Data

US 2024/0362265 A1 Oct. 31, 2024

(51) Int. Cl.
*G06F 16/535* (2019.01)
*G06F 16/538* (2019.01)
*G06F 16/56* (2019.01)
*G06N 3/08* (2023.01)

(52) U.S. Cl.
CPC .......... *G06F 16/535* (2019.01); *G06F 16/538* (2019.01); *G06F 16/56* (2019.01); *G06N 3/08* (2013.01)

(58) Field of Classification Search
CPC ...... G06F 16/535; G06F 16/538; G06F 16/56; G06N 3/08
See application file for complete search history.

(56) References Cited

U.S. PATENT DOCUMENTS

| | | | | |
|---|---|---|---|---|
| 11,048,887 | B1 * | 6/2021 | Gupta | G06N 3/045 |
| 11,838,591 | B2 * | 12/2023 | Karlin | H04N 21/4755 |
| 2018/0075137 | A1 * | 3/2018 | Lifar | G06F 16/337 |
| 2019/0295114 | A1 * | 9/2019 | Pavletic | G06F 18/214 |
| 2020/0143574 | A1 * | 5/2020 | Hall | G06N 3/08 |
| 2021/0020275 | A1 * | 1/2021 | Krishnan | G16H 30/20 |
| 2021/0312628 | A1 * | 10/2021 | Larlus-Larrondo | G06T 7/73 |
| 2022/0067052 | A1 * | 3/2022 | Chauhan | G06N 3/08 |
| 2022/0207872 | A1 * | 6/2022 | Ren | G06N 3/044 |
| 2023/0368268 | A1 * | 11/2023 | Wang | G06Q 30/0631 |
| 2024/0161247 | A1 * | 5/2024 | Lecoq | G06N 3/08 |

\* cited by examiner

*Primary Examiner* — Angelica Ruiz
(74) *Attorney, Agent, or Firm* — Polsinelli PC (57) ABSTRACT

Methods, systems, and apparatus are provided for generating an image. A personalized text prompt is generated by processing an input embedding using a transformer model followed by a first fully connected neural network. The input embedding comprises a multi-dimensional embedding vector associated with a user profile and a plurality of user items. A scored label set is generated identifying a user's preferences by processing a set of attributes for the plurality of user items using a second fully connected neural network. The image is generated by processing the personalized text prompt and the scored label set using a diffusion model.

20 Claims, 9 Drawing Sheets

HYPER-PERSONALIZED PROMPT BASED CONTENT GENERATION

TECHNICAL FIELD

The present subject matter generally relates to the generation of personalized input prompts and images using machine learning techniques.

BACKGROUND

Present image generation models suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Machine learning algorithms that can generate new content are known as generative artificial intelligence (AI) models. Generative AI may create content such as images, text, music, videos, and the like. Some examples of generative AI models include generative adversarial networks (GANs), variational autoencoders, diffusion models, transformer-based models, and recurrent neural networks (RNNs).

Generative AI may ensure the creation of high-quality content by self-learning from datasets with reduced bias. Industry research suggests that generative AI will account for 10% of all data produced, up from less than 1% today. Organizations that can adopt generative AI may have a competitive advantage through faster and less expensive access to data.

Problems with current image generation techniques include poor resolution of generated images, and the need for a user to manually create text prompts with sufficient specificity. Additionally, generative AI models lack fine-tuning and controllability that would otherwise allow the model to focus on generating and manipulating subregions corresponding to the most relevant attributes without affecting the generation of other content.

The present subject matter discloses techniques to augment and automate audio, text, image, and video content creation leveraging natural language understanding (NLU) and generative AI algorithms to overcome the drawbacks, limitations, and disadvantages of the prior art.

Figure 1:
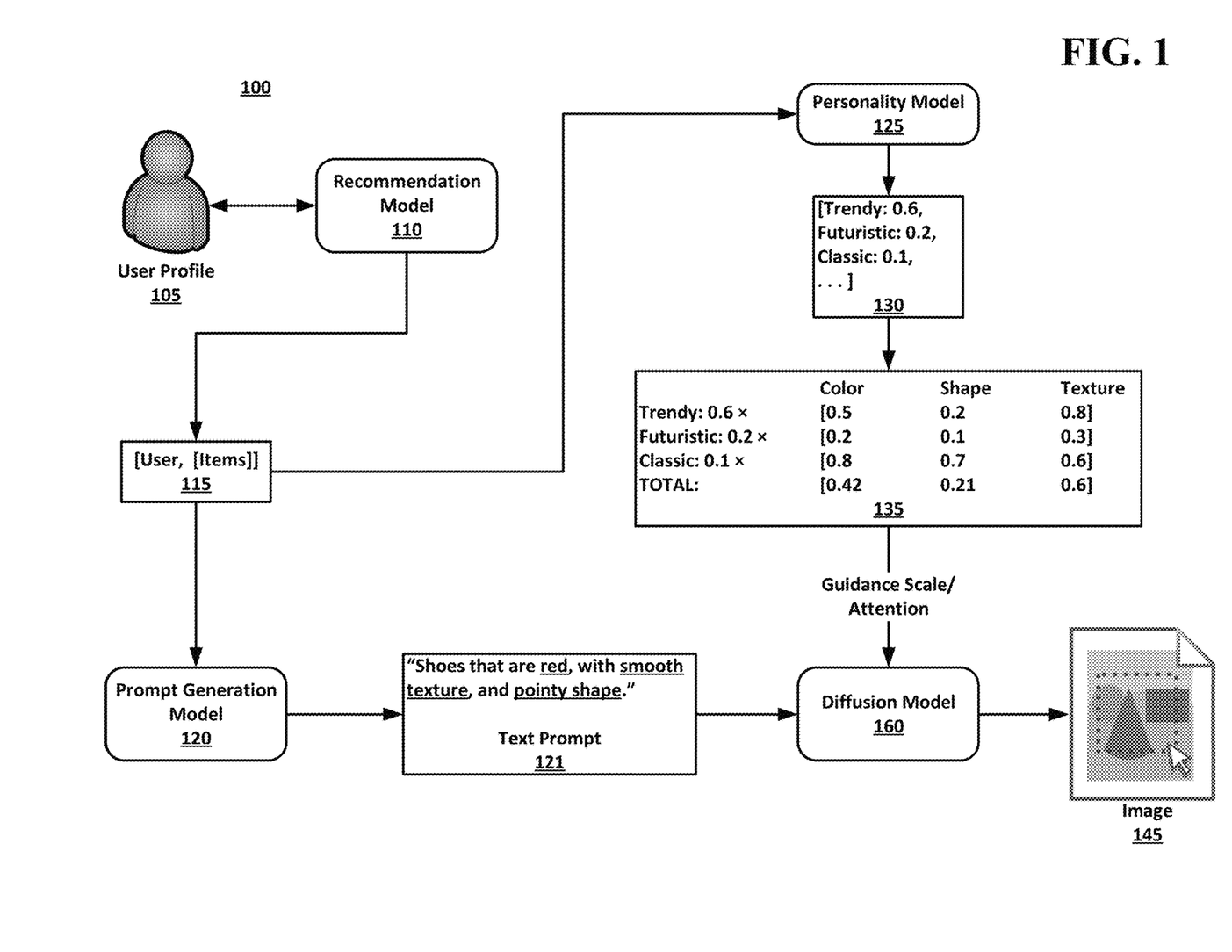
FIG. 1 illustrates an example overview of a system 100.

FIG. 1 illustrates an example overview of a hyper-personalized prompt-based image generation system 100 in accordance with the present subject matter. A user profile 105 may be input to a recommendation model 110, which may generate a scored list of items 115 that are recommended for an identified user. The score may be generated based on a similarity calculation between items the user previously interacted with and all available items in a catalog. The catalog may contain an entire list of items and their respective attributes, which an enterprise customer may have. The scored item list 115 may be provided as input both to a personality model 125 and prompt generation model 120. The personality model 125 may analyze the scored item list 115 to generate a scored label set 130. A set of pre-defined vectors 135 associated with item attributes may be specified to determine how much influence the user's tastes should influence the image generation. A prompt generation model 120 may automatically generate a text prompt 121 based on the scored item list 115. The text prompt 121 and guidance scale/attention generated by the personality model 125 may be input to the diffusion model 160, which may generate the personalized image 145.

The user profile 105 may contain data collected from first and/or third parties and may include information about the user such as demographic information, personality and interests, preference for particular subjects, social media presence, past item purchases, frequency of those item purchases, and/or other items that the user has otherwise interacted with. The user profile 105 may be subsequently used to create item recommendations for a given user, as will be subsequently described. The data stored within the user profile 105 may be either structured or unstructured. For instance, a user's education may be considered structured in that education information may have a relatively consistent format; e.g., associate's, bachelor's, master's, doctorate, etc. followed by the concentration. On the other hand, reviews written by a user may be considered unstructured in that it may lack a consistent format and vary depending on a user's individual writing style.

Figure 2:
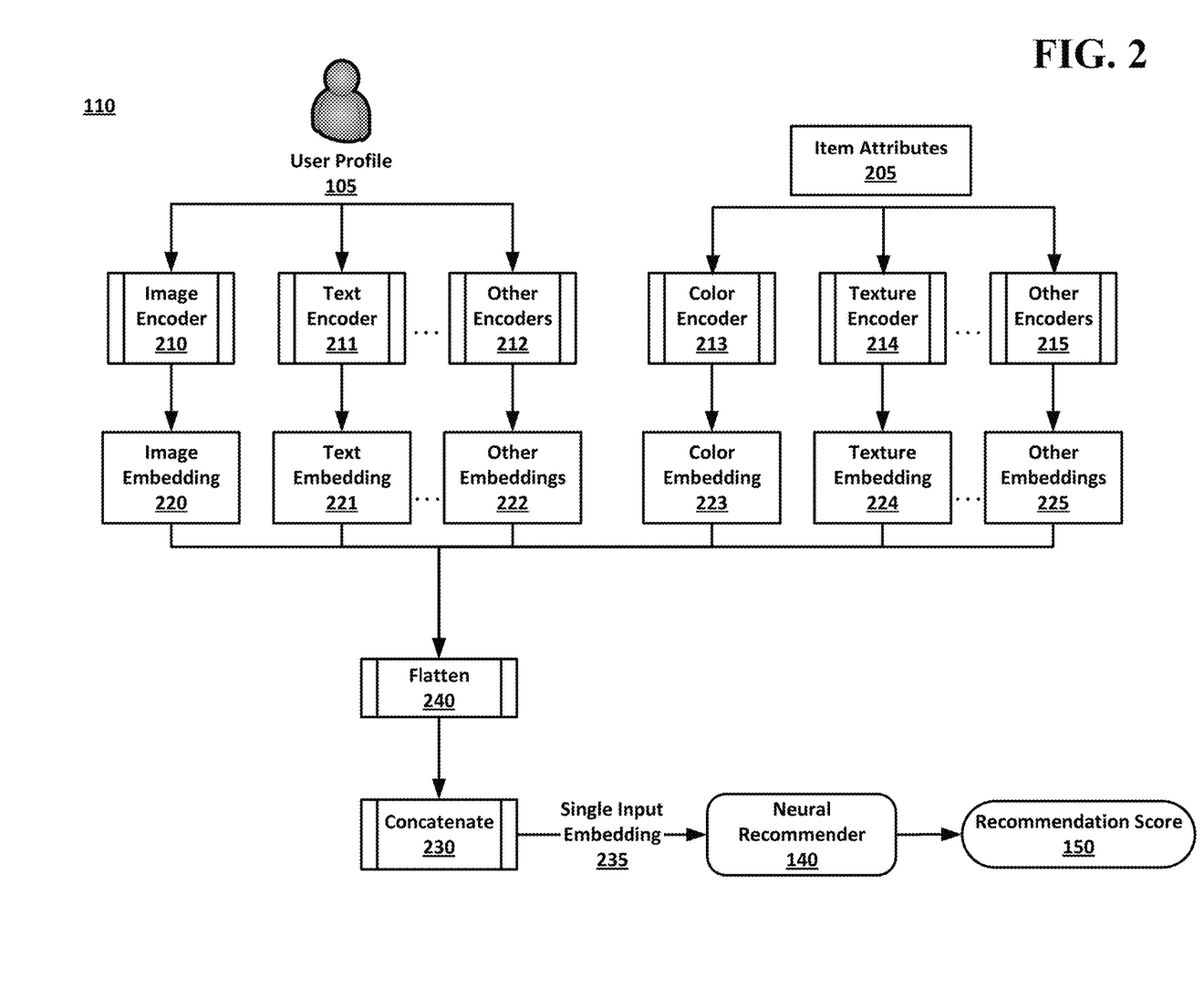
FIG. 2 illustrates a block diagram of an example recommendation model 110 of the system 100.

FIG. 2 illustrates a block diagram of an example recommendation model 110. The recommendation model 110 may accept the user profile 105 and item attributes 205 of items in a catalog as input. Both the user profile 105 and item attributes 205 may contain a variety of structured and unstructured data types, such as images, text, colors, textures, and the like. Each data item of the user profile 105 and item attributes 205 may be input to a corresponding encoder 210-215, which may generate an input embedding 220-225. Example item attributes may be, for instance: [Color: Red, Texture: Smooth, Price: $100]. The encoders 210-212 and 213-215 may operate using pre-trained models that read inputs as numerical values. For instance, an image may be composed of pixels where each pixel has a color value that may be used to represent the image's color and texture. This pixel/color data may be processed and converted to a desired format so that a neural network may extract features from the processed numerical values. The model of the encoder may then reduce the dimensionality by flattening in 240 to generate the final input embedding 220-225. While three encoders 210-212 are shown for encoding the user profile 105 and three encoders 213-215 are shown for encoding the item attributes, additional or fewer encoders may be provided to accommodate a greater or lesser variety of data types. An input embedding may be a set of numerical values that represents a data item in a d-dimensional vector space, where d is greater than 1. Data items that are similar to one another may be spaced more closely within the vector space than data items that are different in terms of Euclidean distance, for example.

The resulting input embeddings 220-225 from all encoders 210-215 may be concatenated 230 to generate a single input embedding 235, which may be of greater dimensionality than any of the individual input embeddings 220-225 and capture the information of all the input embeddings 220-225. The single input embedding 235 may then be input into the neural recommender model 140 to generate a recommendation score 150. The purpose of the concatenation step 230 is to ensure that the neural recommender model 140 makes its recommendation(s) based on all of the attributes treated as a whole. The neural recommender model 140 may also be used to retrieve similar items by identifying similar embeddings using similarity measures within a respective embedding type; e.g., an image similar to an input image, a text similar to an input text. The output of the recommendation model are thus a list of items and their scores for a particular user profile 105.

Figure 3:
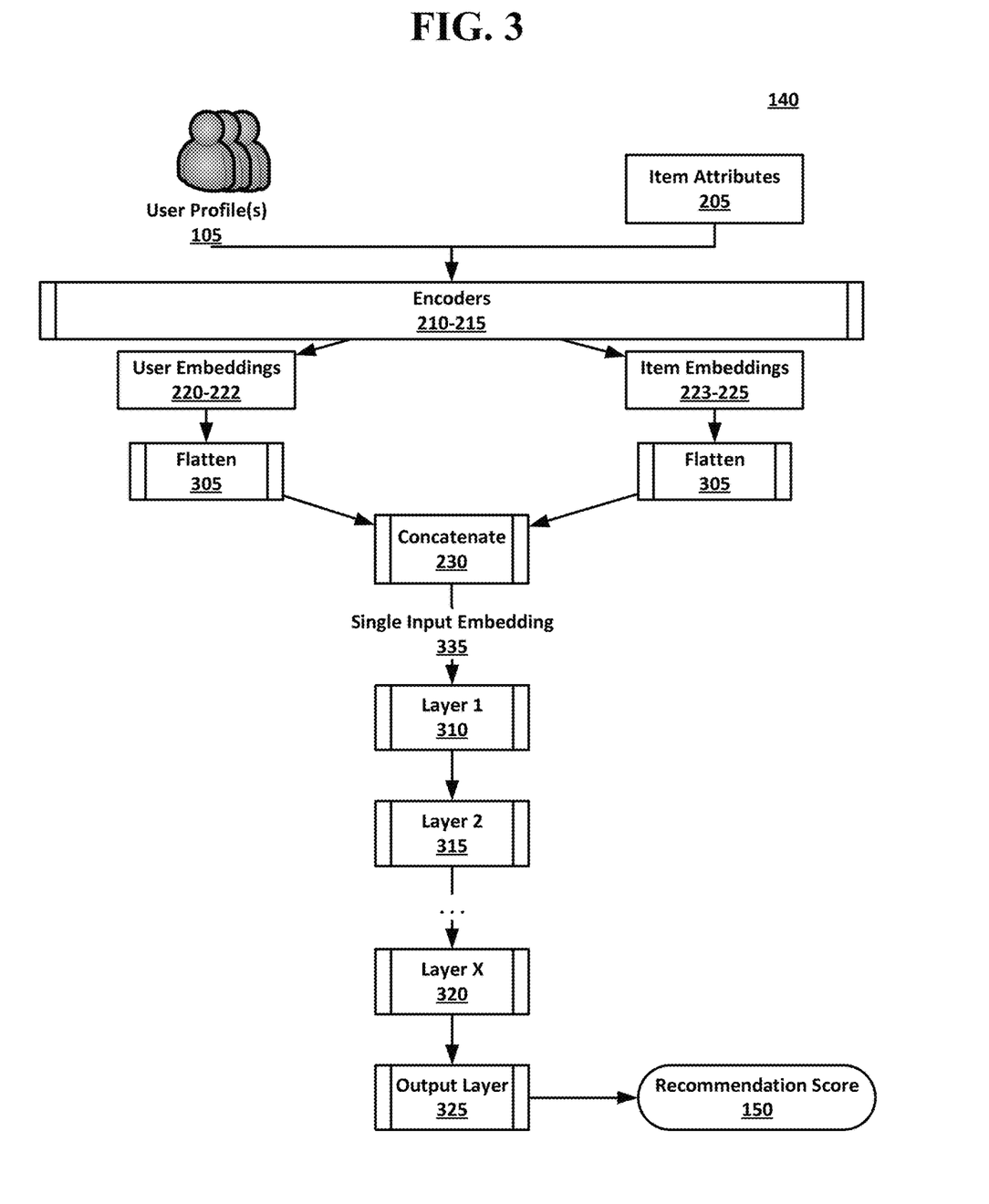
FIG. 3 illustrates a block diagram of an example neural recommender model 140 of the system 100.

FIG. 3 illustrates a block diagram of an example neural recommender model 140. The neural recommender model 140 may be trained based on a list of one or more user profiles 105 and the item attributes 205. During training of the neural recommender model 140, the user profiles 105 and item attributes 205 may be encoded by encoders 210-215 as in the discussion of FIG. 2 to generate user embeddings 220-222 and item embeddings 223-225 having a dimension d, where d is greater than 1. The user profiles 105 and item attributes 205 may be characterized as having high-dimensional, sparse sets of features. The encoders 210-215 may map these high-dimensional sparse feature sets into dense arrays of numbers. The generated embeddings 220-225 may subsequently be flattened 305 to convert each of the d-dimensional embeddings 220-235 to a single, one-dimensional vector having a fixed-length and may be concatenated 230 to combine the flattened user and item embeddings into a single input embedding 335. The flattening of the embeddings 220-225 may be optional. Whether flattening 305 is performed on the embeddings 220-225 may depend on whether fully connected layers are subsequently utilized versus other types of neural network layers, such as recurrent neural network (RNN) layers or convolutional neural network (CNN) layers.

The single input embedding 335 may be subsequently processed by one or more fully connected layers 310/315/320/325 to map the single input embedding 335 to a recommendation score 150. Layer 310 may be an input layer. Layers 315 and 320 may be hidden layers. Layer 325 may be an output layer. Each layer 310/315/320/325 may process its input data by applying a set of operations to transform the data and transfer the data to a subsequent layer 310/315/320/325. These operations may include a linear transformation, wherein an activation function may be applied to a weighted sum of inputs from the previous layer. The weights used in the linear transformation may be obtained during training of the neural recommender model 140 through backpropagation and gradient descent.

Once the neural recommender model 140 has been trained, a user profile 105, which includes a list of items that the corresponding user has interacted with and/or purchased, may be input to the recommendation model 110. The recommendation model 110 may return a recommendation score 150 of all items in the catalog, as previously described. The embeddings of the top n items having the highest recommendation score may then be retrieved and identified as recommended items for this user and as input to the personality model 125 and prompt generation model 120 of FIG. 1.

Figure 4:
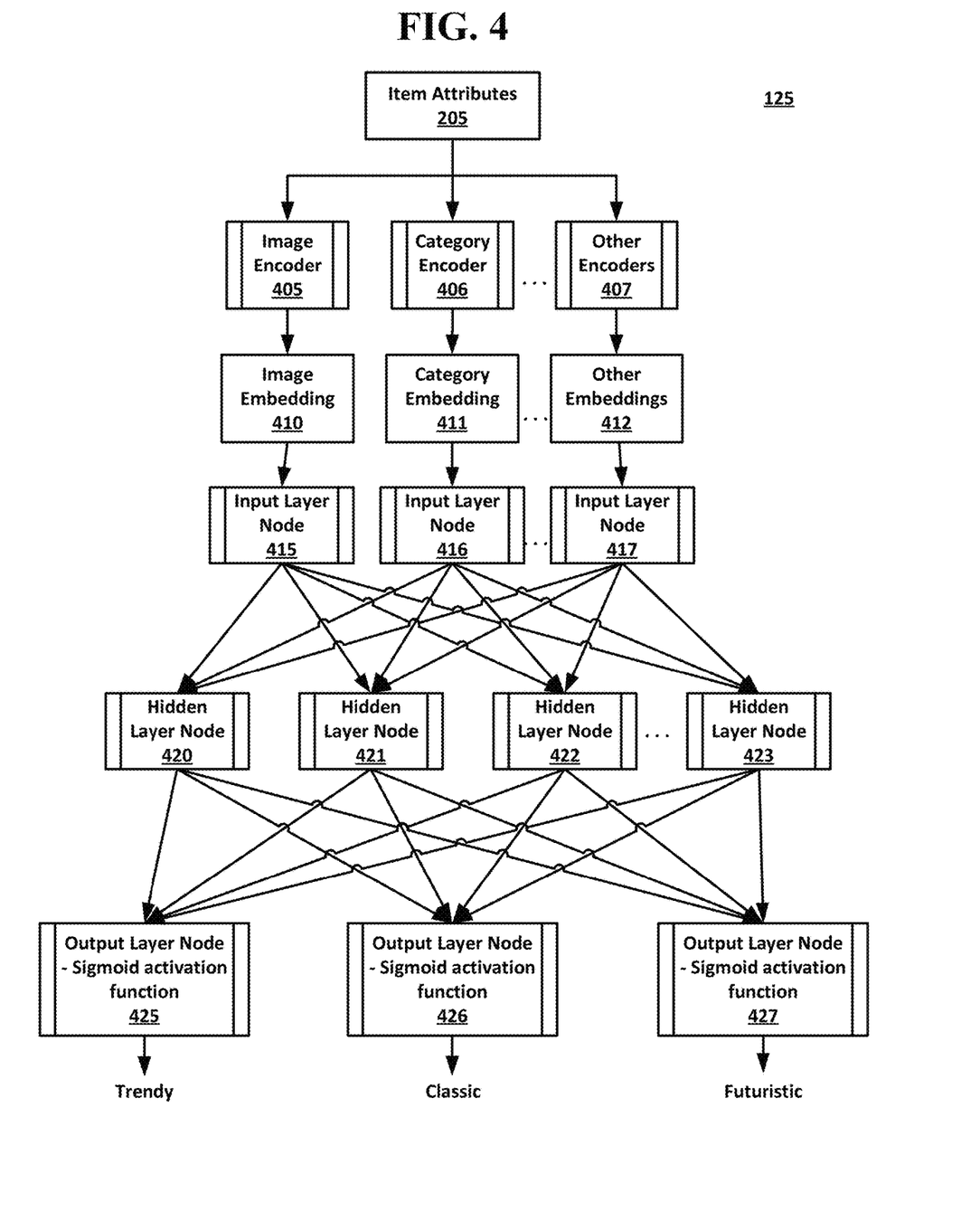
FIG. 4 illustrates a block diagram of an example personality model 125 of the system 100.

FIG. 4 illustrates a block diagram of an example personality model 125. Personality model 125 may analyze items related to a user by past purchase or past interaction. Each item may have an associated review and/or production description, which may be used to train the personality model 125 such that each item may be associated with a score for one or more labels. In one example and as shown in FIG. 4, three labels entitled "trendy," "classic," and "futuristic" may be provided. Following training, the personality model 125 may receive an input item embedding and output a score for each of the three labels. In an example, the score may be a value between 0 and 1 as shown in FIG. 1.

The item attributes 205 may be input to one or more encoders 405-407, depending on the item attribute type, to generate corresponding embeddings 410-412. Encoders 405-407 may operate substantially similarly to encoders 210-215 as previously described. The generated embeddings 410-412 may be subsequently input into a fully connected neural network having three types of layers: an input layer, hidden layer(s), and an output layer. As used herein in the context of neural networks, the terms "neuron" and "node" are used interchangeably. The input layer may include a plurality of input layer nodes 415-417. The hidden layer(s) may include a plurality of hidden layer nodes 420-423. The output layer may include a plurality of output layer nodes 425-427 to generate a score between 0 and 1 for each of the three labels. For each node of the hidden layer(s) (420-423) and the output layer (425-427), a number of inputs may be received, multiplied by the configured weights of the node, and summed to generate a summed activation of the node. The summed activation of the node may then be transformed using an activation function to define a specific output of the node.

The number of input layer nodes may vary depending on the number of features present in the generated embeddings 410-412. The input layer nodes 415-417 may receive the embeddings 410-412 without performing any substantive computations or processing before transferring the embeddings data 410-412 to the subsequent hidden layer nodes 420-423. Accordingly, the input layer may not utilize an activation function.

The hidden layer nodes 420-423 may receive the embeddings 410-412 as passed by the input layer nodes 415-417 and transfer the processed embeddings 410-412 to the output layer nodes 425-427 via a series of weighted connections. During training of the personality model 125, the weights of the connections between the hidden layer nodes 420-423 and the output nodes 425-427 may be adjusted to improve accuracy of the personality model. The number of hidden layers and hidden nodes within each layer may vary depending on the complexity of the embeddings 410-412. The hidden layer(s) may utilize a non-linear activation function to introduce non-linearity to the fully connected neural network to assist with learning complex patterns. In an example, the hidden layer may utilize a rectified linear unit (ReLU) activation function, which may take an input value and produces an output that either matches the input if positive or otherwise produces zero.

The output layer nodes 425-427 may provide the scores for each label. The number of output nodes in the output layer may vary depending on the number of labels desired (e.g., three). In the output layer, an activation function may be applied to transform the output into each label score. In an example, the activation function is a sigmoid function. The sigmoid activation function may be a nonlinear, bounded function that transforms a linear input into nonlinear output between 0 and 1 and may be expressed as follows:

$$S(x) = \frac{1}{1+e^{-x}}$$

In contrast, a softmax activation function may be a nonlinear, unbounded function that may transform a linear input into a probabilistic output and may be expressed as follows:

$$\sigma(\vec{z})_i = \frac{e^{z_i}}{\sum_{j=1}^{K} e^{z_j}}$$

While the softmax function is generally utilized in the output layer of multi-label classification problems, the present subject matter deviates from this conventional practice by utilizing the sigmoid function in the output layer instead. Using a sigmoid function may assume that the output is 1 from all target labels, while the softmax function may allow multiple target labels to be returned as results along with values associated with each label.

By using the output of the personality model 125, the diffusion model may be controlled to generate images that are customized to each user and specific use case. For instance, three attributes may be defined for a desired shoe design: color, texture, and shape. As previously described, the personality model 125 may utilize the user's profile 105 to generate a scored label set 130 having three target labels: "trendy," "futuristic," and "classic." These target labels and the corresponding scores may be understood, for example, to characterize the corresponding user's tastes in fashion. Each of these target labels may be associated with a three-dimensional vector 135 corresponding to the three design attributes. The target labels may be manually generated by subject matter experts, for example, or learned automatically. The weights for a target label may be learned by observing the variation of color, for example, across all images having a same target label. The three-dimensional vector 135 may reflect the amount of freedom or improvisation allocated to the diffusion model 160 in performing the subsequent image generation; in other words, the amount of limit or control implemented on the stochastic process involved with diffusion models. An example set of three-dimensional vectors 135 associated with each of the target labels is provided in Table 1 below:

TABLE 1

| Scored Personality Labels | Color | Shape | Texture |
| --- | --- | --- | --- |
| Trendy 0.6 | 0.5 | 0.2 | 0.8 |
| Futuristic 0.2 | 0.2 | 0.1 | 0.3 |
| Classic 0.1 | 0.8 | 0.7 | 0.6 |
| TOTAL | 0.42 | 0.21 | 0.6 |

As shown in the example of Table 1, the "trendy" target label may be associated with the vector [0.5, 0.2, 0.8], which may be understood to mean that the diffusion model 160 may have 0.5 freedom in color, 0.2 freedom in shape, and 0.8 freedom in texture in terms of how "trendy" a shoe design image may be generated. The scored label set 130 determined by the personality model and associated with each target label may be scaled by each three-dimensional vector 135 in the same row and summed to compute the total vector. For example, in the "color" column, the total may be computed as follows:

$$0.6 \times 0.5(\text{Trendy}) + 0.2 \times 0.2(\text{Futuristic}) + 0.1 \times 0.8(\text{Classic}) = 0.42$$

The three-dimensional "total" vector may be subsequently input into the diffusion model 160 along with a guidance scale/attention variable. The guidance scale/attention variable may indicate how dependent the personalized image 145 generated by the diffusion model 160 should be based on the input caption. For instance, a guidance scale of 0 would generate a random image that does not depend at all on the caption. In accordance with the present subject matter, a multi-dimensional guidance scale may indicate the dependence of the generated personalized image 145 on the scored personality labels 135 generated by the personality model 125.

Figure 5:
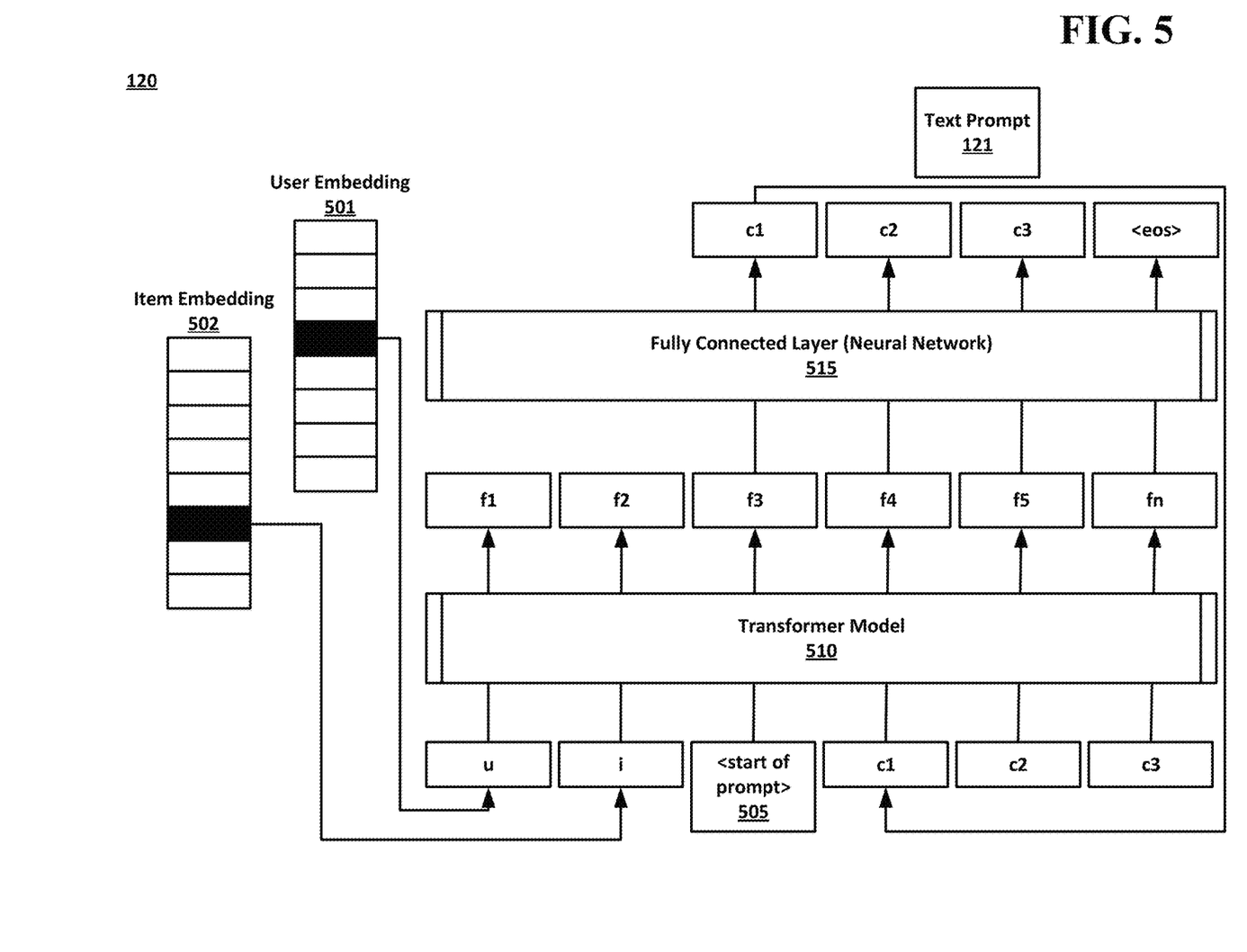
FIG. 5 illustrates a block diagram of an example prompt generation model 120 of the system 100.

FIG. 5 illustrates a block diagram of an example prompt generation model 120. The prompt generation model 120 may generate a text prompt 121 based on the scored item list 115 identifying the user and recommended items for that user generated by the recommendation model 110. The prompt generation model 120 may begin using the user and item identifier information 501-502, which is derived from the scored item list 115. Each user and item identifier may be used to index into a lookup table to retrieve the corresponding embeddings "u" and "i" as shown in FIG. 5. In this example, "u" represents a user embedding, while "i" represents an item embedding. The embeddings may be followed by a <start of prompt> character 505 to generate a text prompt 121. The transformer model 510 may operate as a language model to convert the user and item embedding ("u," "i") to a text prompt 121. Output features (i.e., f1-fn) may be passed through a fully connected layer 515 to provide an output for each new prompt character (i.e., c1-c3). For instance, output feature f3 may be the output of transformer model 510 in response to input <start of prompt> 505. Output feature f3 may be provided to fully connected layer 515 to cause an output c1, which may be a word part of the text prompt 121. The c1 word (as well as c2, c3, etc.) may be provided in a feedback arrangement to the input of the transformer model 510, which may be used to generate an output feature f4, which is provided to the fully connected layer 515, and becomes output word part c2. This cycle may continue until the end of sentence tag <EoS>. The prompt generation model 120 may be trained using a dataset compiled from scraped item reviews. Specifically, the transformer model 510 may be trained from end-to-end unlike other conventional approaches that utilize pretrained transformer models to perform similar tasks. The prompt generation model 120 may generate the text prompt 121 as output.

Figure 6:
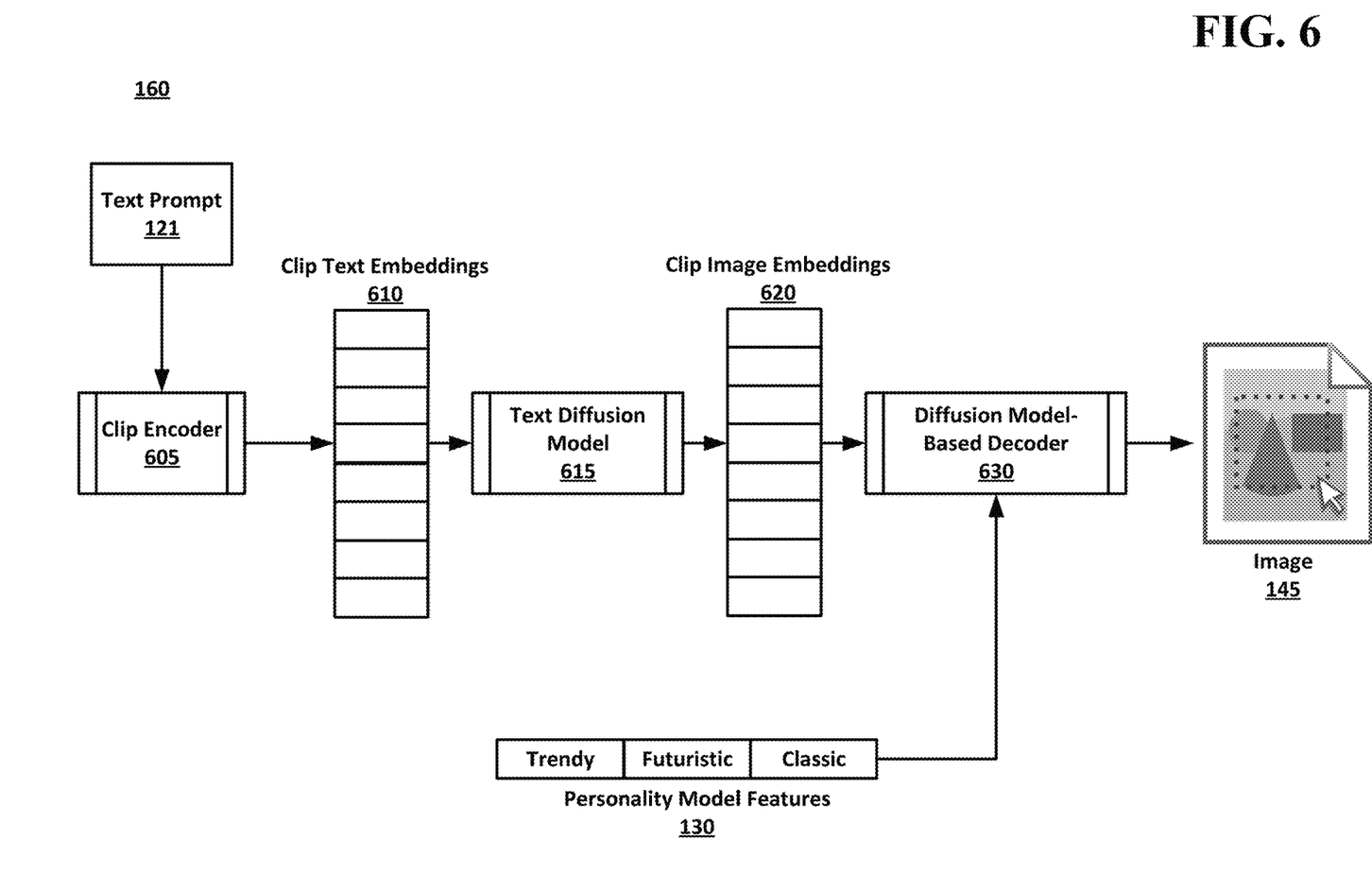
FIG. 6 illustrates a block diagram of an example diffusion model of the system 100.

FIG. 6 illustrates a block diagram of an example diffusion model 160. The diffusion model 160 may include a clip encoder 605, text diffusion model 615, and diffusion model-based decoder 630. The diffusion model 160 may receive the model-generated text prompt 121 as input and pass it to a clip encoder 605, which may generate clip text embeddings 610. The clip text embeddings 610 may be passed to a text diffusion model 615, which may generate clip image embeddings 620. The text diffusion model 615 may be a generative model that operates using the diffusion principle. Based on the clip image embeddings 620 and the personality model features of the scored label set 130 generated by the personality model 125, the diffusion model-based decoder 630 may generate the personalized image 145. The personality model features of the scored label set 130 may inform the diffusion model-based decoder 630 as to which parts of the text prompt 121 to focus on when generating the personalized image 145. The diffusion model-based decoder 630 may work on classifier-free guidance using the following base diffusion function:

$$\nabla_x \log\, p_\gamma(x\,|\,c) = (1 - \gamma_1 - \gamma_2 - \gamma_3 - \gamma_4)\nabla_x \log p(x) + \gamma_1 \nabla_x \log p(c\,|\,x) +$$
$$\gamma_2 \nabla_x \log p(c1\,|\,x) + \gamma_3 \nabla_x \log p(c2\,|\,x) + \gamma_4 \nabla_x \log p(c3\,|\,x)$$

At the outset, it should be noted that the "c1," "c2," and "c3" terms in the base diffusion function above are different from the textual prompt words c1-c3 shown and described with reference to FIG. 5. In the above equation, $\nabla_x$ is the score function, and $\gamma_1$ is the guidance scale for caption (as in DALL-E 2). The $\gamma_1$ will establish for the model how dependent the generated personalized image 145 should be based on the input text prompt 121. Similarly, symbols $\gamma_2$, $\gamma_3$, and $\gamma_4$ are guidance scales for parts of captions c1, c2, and c3; one for each of color, shape, and texture (or any other example attribute). Each $\gamma$ value may range between 0 and 1, based on the similarity between the caption description of an image and the text prompt. For example, where $\gamma$ is 0, the caption description may be identical to the text prompt; where $\gamma$ is 1, the caption description may be completely different from the text prompt. $\gamma_1$ may be understood as the relevance between the caption and image and may be calculated using the clip encoder 605. Captions c1, c2, and c3 may be obtained using entity recognition for each of the personality model features of the scored label set 130. The sum of $\gamma_1$, $\gamma_2$, $\gamma_3$, and $\gamma_4$ should be less than 1.

Figure 7:
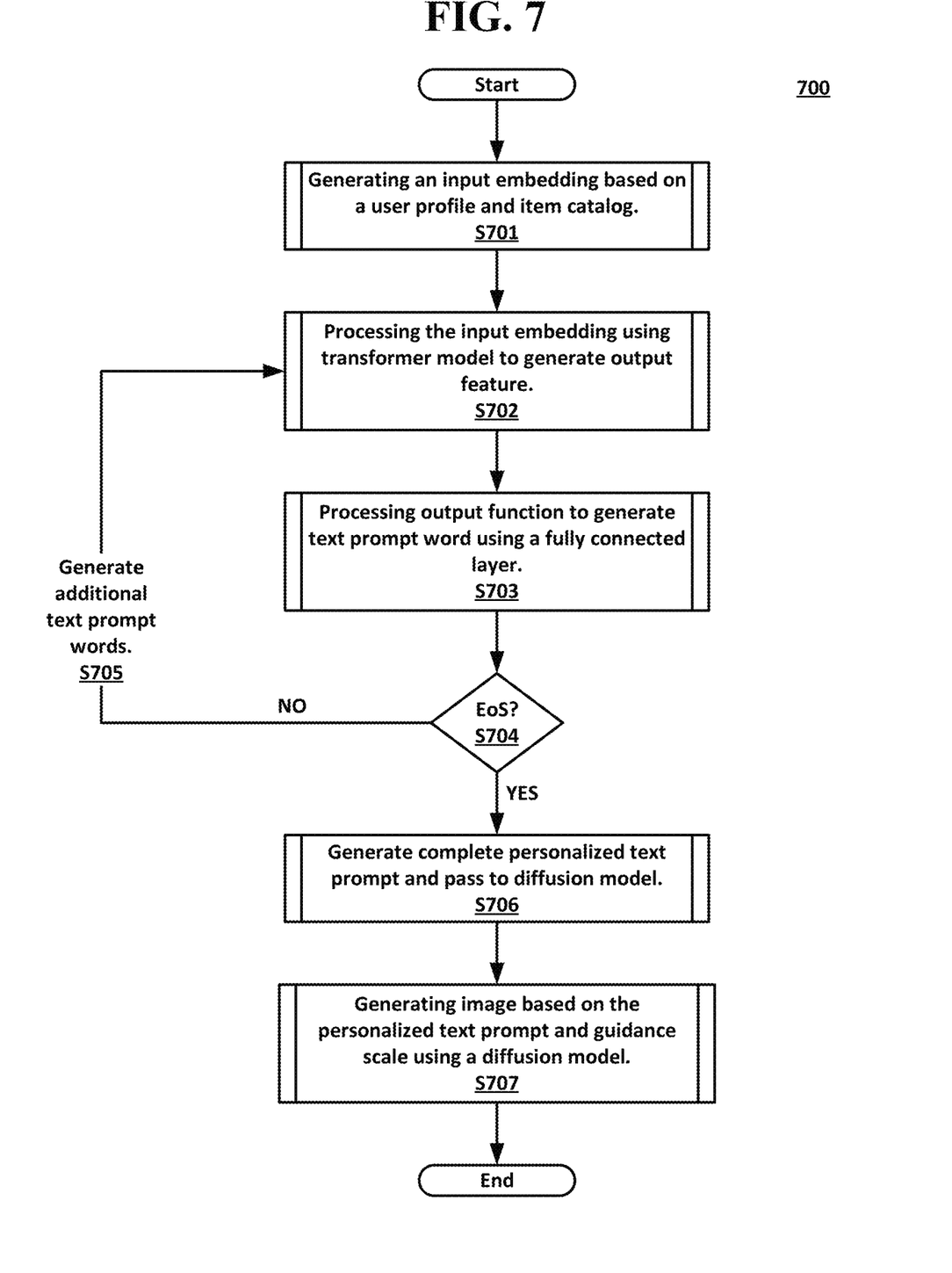
FIG. 7 illustrates an example algorithm 700 to generate a personalized image using the system 100.

FIG. 7 shows an example algorithm 700 to generate a personalized image. In step S701, an input embedding may be generated based on the user profile 105 and a catalog of item attributes 205. In S702, the input embedding may be processed using the transformer model 510 to generate one or more output features f1-fn. In S703, the fully connected layer may further process the output features 515 to generate a text prompt word (e.g., c1). In S704, the process may determine whether an end-of-sentence (EoS) tag has been reached. If not, the fully connected layer 515 may continue to generate additional text prompt words (e.g., c2, c3, etc.) until the end of sentence tag is identified, and the process may move to S706 where the completed personalized text prompt 121 may be passed to the diffusion model 160. In S707, the personalized image 145 may be generated based on the personalized text prompt 121 and a guidance scale.

Figure 8:
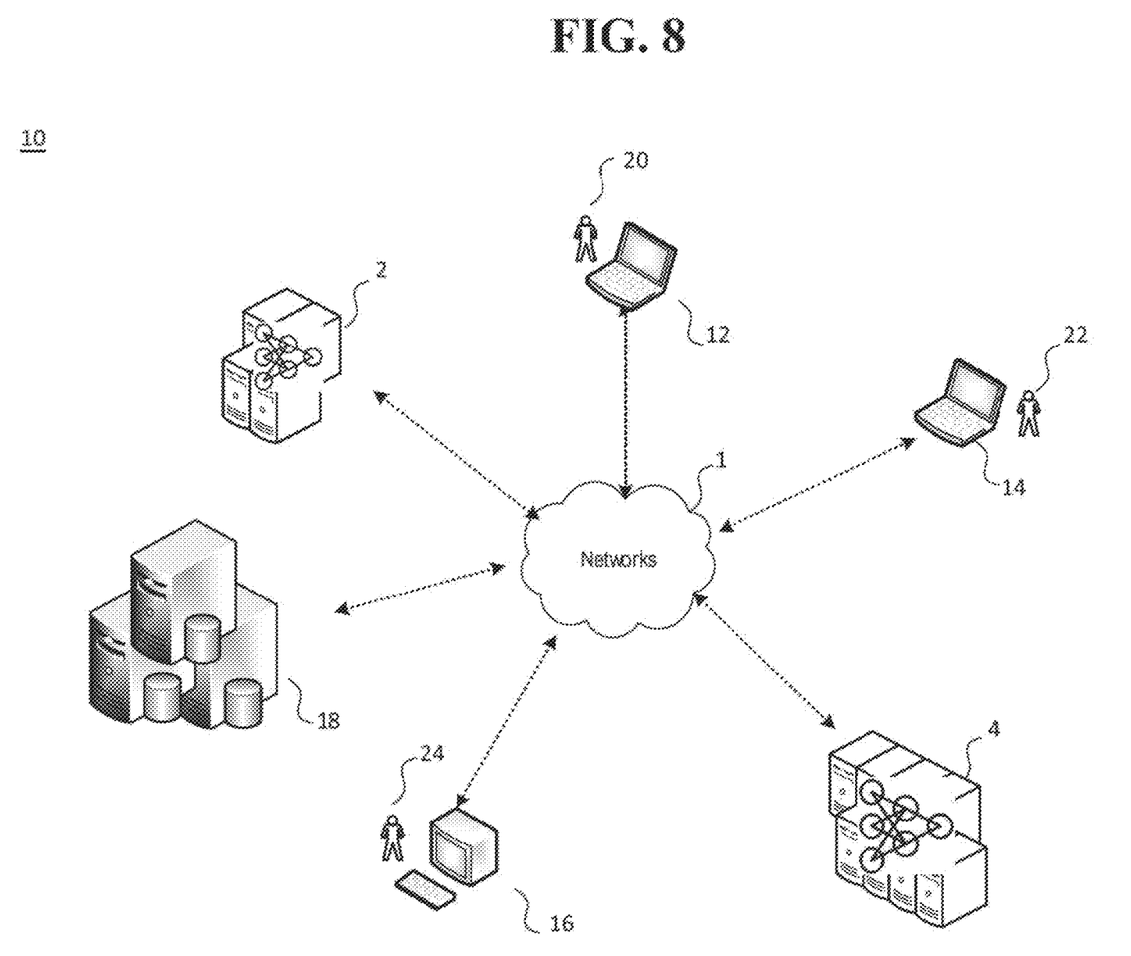
FIG. 8 illustrates an example electronic communication environment for implementing the system 100.

FIG. 8 shows an example electronic communication environment 10 in which a hyper-personalized prompt-based image generation system 100 may be implemented. The electronic communication environment 10 may include a portion or all the following: one or more servers 2 and 4, one or more user devices 12, 14, and 16 associated with users 20, 22, and 24, and one or more databases 18, in communication with each other via public or private communication networks 1.

The user devices 12, 14, and 16 may be any form of mobile or fixed electronic devices including but not limited to desktop personal computer, laptop computers, tablets, mobile phones, personal digital assistants, and the like.

The one or more database 18 of FIG. 8 may be hosted in a central database server, a plurality of distributed database servers, or in cloud-based database hosts. The database 18 may be organized and implemented in any form, including but not limited to document database containing text data (and/or other types of data), lists of topics, keywords, and/or entities, embedding space database containing embeddings (or embedding vectors) and relationships, and the like. The database 18 may be configured to store the intermediate data and/or final results for implementing the hyper-personalized prompt-based image generation system 100.

Figure 9:
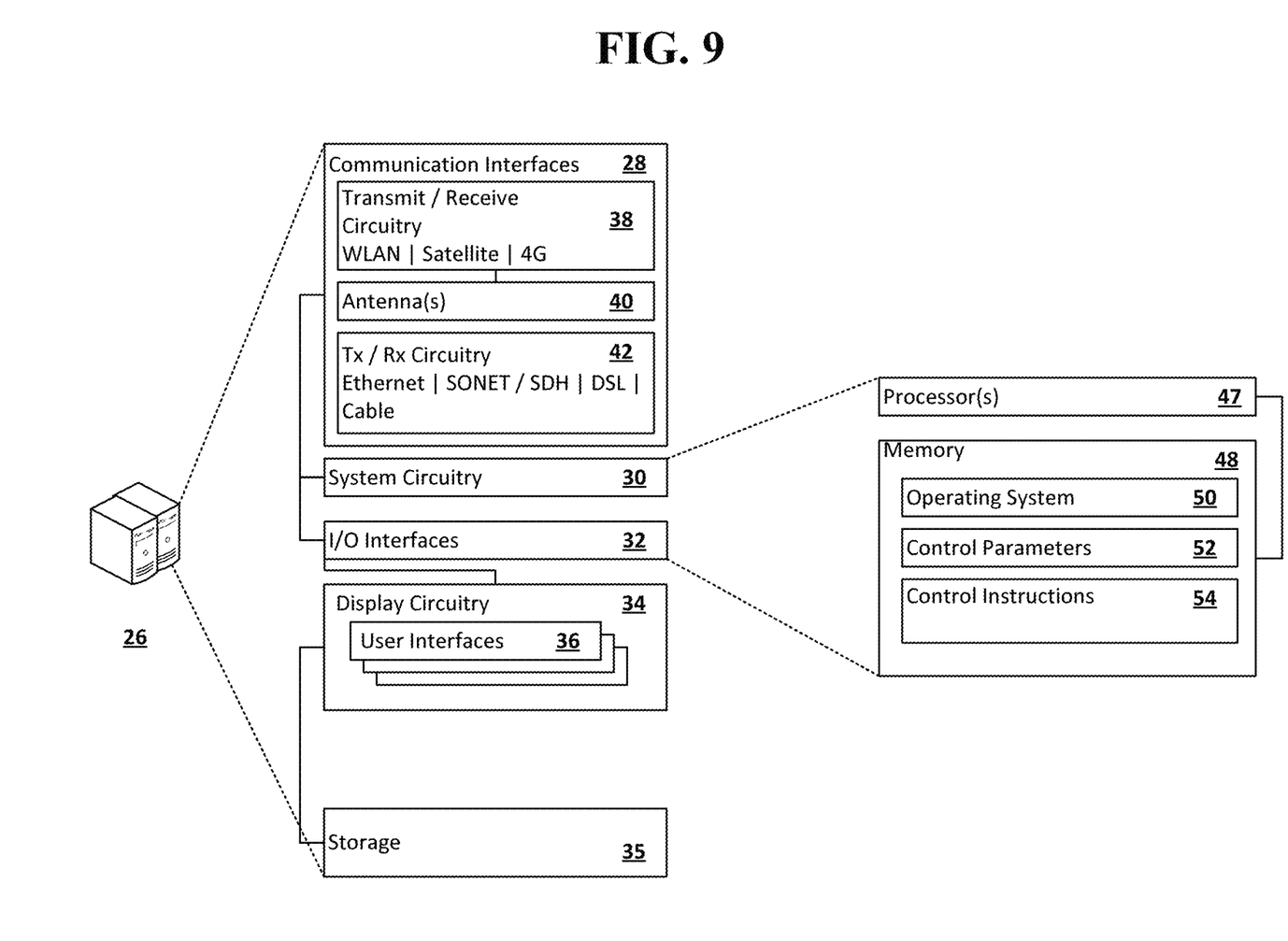
FIG. 9 illustrates computer systems that may be used to implement various components of the system 100.

FIG. 9 shows an example computer system 26 for implementing the one or more servers 2 and 4, or the user devices 12, 14, and 16. The computer system 26 may include communication interfaces 28, system circuitry 30, input/output (I/O) interfaces 32, storage/memory 35, and display circuitry 34 that generates machine interfaces 36 locally or for remote display, e.g., in a web browser running on a local or remote machine. The machine interfaces 36 and the I/O interfaces 32 may include GUIs, touch sensitive displays, voice or facial recognition inputs, buttons, switches, speakers, and other user interface elements. Additional examples of the I/O interfaces 32 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CD-ROM or DVD drive), serial and parallel bus interfaces, and keyboard and mouse interfaces.

The communication interfaces 28 may include wireless transmitters and receivers ("transceivers") 38 and any antennas 40 used by the transmitting and receiving circuitry of the transceivers 38. The transceivers 38 and antennas 40 may support Wi-Fi network communications, for instance, under any version of IEEE 802.11, e.g., 802.11n or 802.11ac. The communication interfaces 28 may also include wireline transceivers 42. The wireline transceivers 42 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage/memory 35 may be used to store various initial, intermediate, or final data or model for implementing the hyper-personalized prompt-based image generation system 100. These data may alternatively be stored in the database 18 of FIG. 5. In one implementation, the storage/memory 35 of the computer system 26 may be integral with the database 18 of FIG. 5. The storage/memory 35 may be centralized or distributed, and may be local or remote to the computer system 26. For example, the storage/memory 35 may be hosted remotely by a cloud computing service provider.

The system circuitry 30 may include hardware, software, firmware, or other circuitry in any combination. The system circuitry 30 may be implemented, for example, with one or more systems on a chip (SoC), application specific integrated circuits (ASIC), microprocessors, discrete analog and digital circuits, and other circuitry.

For example, the system circuitry 30 may be implemented as 46 for the hyper-personalized prompt-based image generation system 100. The system circuitry 30 may include one or more processors 47 and memories 48. The memories 48 stores, for example, control instructions 52 and an operating system 50. The control instructions 52, for example may include instructions for implementing the components 54 of the hyper-personalized prompt-based image generation system 100. In one implementation, the instruction processors 47 execute the control instructions 52 and the operating system 50 to carry out any desired functionality related to the hyper-personalized prompt-based image generation system 100.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method for generating an image, including generating a personalized text prompt by processing an input embedding using a transformer model followed by a first fully connected neural network, wherein the input embedding comprises a multi-dimensional embedding vector associated with a user profile and a plurality of user items; generating a scored label set identifying a user's preferences by processing a set of attributes for the plurality of user items using a second fully connected neural network; and generating the image by processing the personalized text prompt and the scored label set using a diffusion model.

A second aspect relates to the method of aspect 1, wherein the diffusion model comprises a clip encoder, and processing the personalized text prompt includes processing the text prompt by the clip encoder to generate a plurality of clip text embeddings.

A third aspect relates to the method of any preceding aspect, wherein the diffusion model further comprises a text diffusion model, and processing the personalized text prompt further includes processing the plurality of clip text embeddings using the text diffusion model to generate a plurality of clip image embeddings.

A fourth aspect relates to the method of any preceding aspect, wherein the diffusion model further comprises a diffusion model-based decoder, and processing the personalized text prompt further includes processing the plurality of clip image embeddings using the diffusion model-based decoder.

A fifth aspect relates to the method of any preceding aspect, wherein the multi-dimensional embedding vectors comprises first multi-dimensional vectors, and the scored label set is associated with a second multi-dimensional vector comprising numeric data defining an amount of freedom or improvisation allocated to the diffusion model-based decoder in generating the image.

A sixth aspect relates to the method of any preceding aspect, further including generating a recommendation score for each of a plurality of catalog items by processing the set of attributes for the plurality of user items and a profile of the user using a third fully connected neural network, wherein the recommendation score ranks the catalog items according to which items would be relevant to the user.

A seventh aspect relates to the method of any preceding aspect, wherein the second fully connected neural network comprises an output layer node to which a sigmoid activation function is applied.

An eighth aspect relates to the method of any preceding aspect, wherein the scored label set comprises a numeric score, and the method further includes scaling a dimension of the multi-dimensional vector by the numeric score.

A ninth aspect relates to the method of any preceding aspect, wherein the input embedding includes an item embedding and a user embedding, and generating the personalized text prompt by processing the input further includes generating, using the transformer model, an output feature from the item embedding and the user embedding.

A tenth aspect relates to the method of any preceding aspect wherein generating the personalized text prompt by processing the input further includes inputting the output feature to the first fully connected neural network using a transformer model to generate a prompt word of the personalized text prompt.

An eleventh aspect relates to the method of any preceding aspect wherein generating the personalized text prompt by processing the input further includes providing the prompt word in feedback to input to the transformer model.

A twelfth aspect relates to the method of any preceding aspect wherein the output feature is a first output feature, and generating the personalized text prompt by processing the input further includes generating a second output feature using the transformer model based on the prompt word.

A thirteenth aspect relates to the method of any preceding aspect, further including generating the input embedding by processing the user profile and the plurality of user items using a plurality of encoders comprising pre-trained models; and reducing the dimensionality of the input embedding by flattening.

A fourteenth aspect relates to the method of any preceding aspect further including controlling the relevance between the image and the personalized text prompt using a guidance scale.

A fifteenth aspect relates to the method of any preceding aspect wherein the diffusion model-based decoder operates on classifier-free guidance using a base diffusion function.

A sixteenth aspect relates to a system including a processor; a memory in communication with the processor and storing instructions executable by the processor to configure the system to: generate a personalized text prompt by processing an input embedding using a transformer model followed by a first fully connected neural network, wherein the input embedding comprises a multi-dimensional embedding vector associated with a user profile and a plurality of user items; generate a scored label set identifying a user's preferences by processing a set of attributes for the plurality of user items using a second fully connected neural network; and generate an image by processing the personalized text prompt and the scored label set using a diffusion model.

A seventeenth aspect relates to the system of aspect 16 wherein the diffusion model comprises a clip encoder, and the memory further stores instructions executable by the processor to configure the system to: process the text prompt by the clip encoder to generate a plurality of clip text embeddings.

An eighteenth aspect relates to the system of aspects 16 and 17, wherein the diffusion model further comprises a text diffusion model, and the memory further stores instructions executable by the processor to configure the system to: process the plurality of clip text embeddings using the text diffusion model to generate a plurality of clip image embeddings.

A nineteenth aspect relates to the system of aspects 16-18, wherein the memory further stores instructions executable by the processor to configure the system to: generate a recommendation score for each of a plurality of catalog items by processing the set of attributes for the plurality of user items and a profile of the user using a third fully connected neural network, wherein the recommendation score ranks the catalog items according to which items would be relevant to the user.

A twentieth aspect relates to the system of aspects 16-19 wherein the second fully connected neural network comprises an output layer node to which a sigmoid activation function is applied.

The invention claimed is:

1. A method for generating a personalized image, comprising:
    generating a personalized text prompt by processing an input embedding using a transformer model followed by a first fully connected neural network, wherein the input embedding comprises a multi-dimensional embedding vector associated with a user profile and a plurality of user items;
    generating a scored label set identifying a user's preferences by processing a set of attributes for the plurality of user items using a second fully connected neural network that is different from the first fully connected neural network, wherein:
        the scored label set includes a plurality of target labels and a score assigned to each of the plurality of target labels, and
        the score of a target label of the plurality of target labels characterizes the user's preferences corresponding to the target label; and
    generating the personalized image by processing the personalized text prompt and the scored label set using a diffusion model.

2. The method of claim 1, wherein
the diffusion model comprises a clip encoder, and
processing the personalized text prompt comprises:
    processing the personalized text prompt by the clip encoder to generate a plurality of clip text embeddings.

3. The method of claim 2, wherein
the diffusion model further comprises a text diffusion model, and
processing the personalized text prompt further comprises:
    processing the plurality of clip text embeddings using the text diffusion model to generate a plurality of clip image embeddings.

4. The method of claim 3, wherein
the diffusion model further comprises a diffusion model-based decoder, and
processing the personalized text prompt further comprises:
    processing the plurality of clip image embeddings using the diffusion model-based decoder.

5. The method of claim 1, wherein
the diffusion model comprises a diffusion model-based decoder,
the multi-dimensional embedding vector comprises first multi-dimensional vector, and
the scored label set is associated with a second multi-dimensional vector comprising numeric data defining an amount of freedom or improvisation allocated to the diffusion model-based decoder in generating the personalized image.

6. The method of claim 1, further comprising:
generating a recommendation score for each of a plurality of catalog items by processing the set of attributes for the plurality of user items and a profile of the user using a third fully connected neural network, wherein the recommendation score ranks the plurality of catalog items according to which items would be relevant to the user.

7. The method of claim 1, wherein the second fully connected neural network comprises an output layer node to which a sigmoid activation function is applied.

8. The method of claim 1, wherein
the scored label set comprises a numeric score, and
the method further comprises:
    scaling a dimension of the multi-dimensional embedding vector by the numeric score.

9. The method of claim 1, wherein
the input embedding comprises:
    an item embedding and a user embedding, and
    generating the personalized text prompt by processing the input embedding further comprises:
        generating, using the transformer model, an output feature from the item embedding and the user embedding.

10. The method of claim 9, wherein generating the personalized text prompt by processing the input embedding further comprises:
    inputting the output feature to the first fully connected neural network using the transformer model to generate a prompt word of the personalized text prompt.

11. The method of claim 10, wherein generating the personalized text prompt by processing the input embedding further comprises:
    providing the prompt word in feedback to input to the transformer model.

12. The method of claim 11, wherein
the output feature is a first output feature, and
generating the personalized text prompt by processing the input embedding further comprises:
    generating a second output feature using the transformer model based on the prompt word.

13. The method of claim 1, further comprising:
generating the input embedding by processing the user profile and the plurality of user items using a plurality of encoders comprising pre-trained models; and
reducing the dimensionality of the input embedding by flattening.

14. The method of claim 1, further comprising:
controlling relevance between the personalized image and the personalized text prompt using a guidance scale.

15. The method of claim 4, wherein the diffusion model-based decoder operates on classifier-free guidance using a base diffusion function.

16. A system comprising:
a processor;
a memory in communication with the processor and storing instructions executable by the processor to configure the system to:

generate a personalized text prompt by processing an input embedding using a transformer model followed by a first fully connected neural network, wherein the input embedding comprises a multi-dimensional embedding vector associated with a user profile and a plurality of user items;

generate a scored label set identifying a user's preferences by processing a set of attributes for the plurality of user items using a second fully connected neural network that is different from the first fully connected neural network, wherein:

the scored label set includes a plurality of target labels and a score assigned to each of the plurality of target labels, and the score of a target label of the plurality of target labels characterizes the user's preferences corresponding to the target label; and generate a personalized image by processing the personalized text prompt and the scored label set using a diffusion model.

17. The system of claim 16, wherein
the diffusion model comprises a clip encoder, and
the memory further stores instructions executable by the processor to configure the system to:
process the personalized text prompt by the clip encoder to generate a plurality of clip text embeddings.

18. The method of claim 2, wherein
the diffusion model further comprises a text diffusion model, and
the memory further stores instructions executable by the processor to configure the system to:
process the plurality of clip text embeddings using the text diffusion model to generate a plurality of clip image embeddings.

19. The system of claim 16, wherein the memory further stores instructions executable by the processor to configure the system to:
generate a recommendation score for each of a plurality of catalog items by processing the set of attributes for the plurality of user items and a profile of the user using a third fully connected neural network, wherein the recommendation score ranks the plurality of catalog items according to which items would be relevant to the user.

20. The system of claim 16, wherein the second fully connected neural network comprises an output layer node to which a sigmoid activation function is applied.

* * * * *